(12) United States Patent
Delapierre et al.

(10) Patent No.: US 7,914,679 B2
(45) Date of Patent: Mar. 29, 2011

(54) METHOD FOR EXTRACTING AT LEAST ONE COMPOUND FROM A LIQUID PHASE COMPRISING A FUNCTIONALIZED IONIC LIQUID, AND MICROFLUIDIC SYSTEM FOR IMPLEMENTING SAID METHOD

(75) Inventors: Guillaume Delapierre, Vif (FR); Nicolas Sarrut, Seyssinet-Pariset (FR); Gilles Marchand, Pierre Chatel (FR)

(73) Assignee: Commissariat a l'energie Atomique, Paris (FR)

( * ) Notice: Subject to any disclaimer, the term of this patent is extended or adjusted under 35 U.S.C. 154(b) by 630 days.

(21) Appl. No.: 11/912,077

(22) PCT Filed: Apr. 6, 2006

(86) PCT No.: PCT/FR2006/000759
§ 371 (c)(1),
(2), (4) Date: Apr. 23, 2008

(87) PCT Pub. No.: WO2006/111628
PCT Pub. Date: Oct. 26, 2006

(65) Prior Publication Data
US 2008/0185339 A1    Aug. 7, 2008

(30) Foreign Application Priority Data
Apr. 19, 2005  (FR) ...................................... 05 03887

(51) Int. Cl.
*B01D 11/04*  (2006.01)

(52) U.S. Cl. .......................... 210/634; 210/638; 210/643
(58) Field of Classification Search .................. 210/634, 210/635, 638, 642, 643
See application file for complete search history.

(56) References Cited

FOREIGN PATENT DOCUMENTS
EP    1 466 894    10/2004
WO    96/12541    5/1996
WO    99/54730    10/1999

OTHER PUBLICATIONS

Washizu, Masao, "Electrostatic Actuation of Liquid Droplets for Microreactor Applications", IEEE Transactions on Industry Application, vol. 34, No. 4, pp. 732-737, 1998.

*Primary Examiner* — John Kim
(74) *Attorney, Agent, or Firm* — Oblon, Spivak, McClelland, Maier & Neustadt, L.L.P.

(57) ABSTRACT

A method for extracting at least one chemical or biological compound from a liquid phase including at least one functionalized ionic liquid, via a liquid extracting fluid that is miscible with the ionic liquid, and a microfluidic system implementing the method. The extraction method includes moving, on one surface of a microfluidic system, at least one microdrop of the liquid phase into an extraction solution that includes the extracting fluid and that is localized on the surface to obtain in output of the solution, under effect of an electric field, an extract moving away from the surface that is rich in extracting fluid and enriched in the at least one compound, and a raffinate moving on the surface that is rich in ionic liquid and deleted in the at least one compound.

23 Claims, 4 Drawing Sheets

Figure 1:
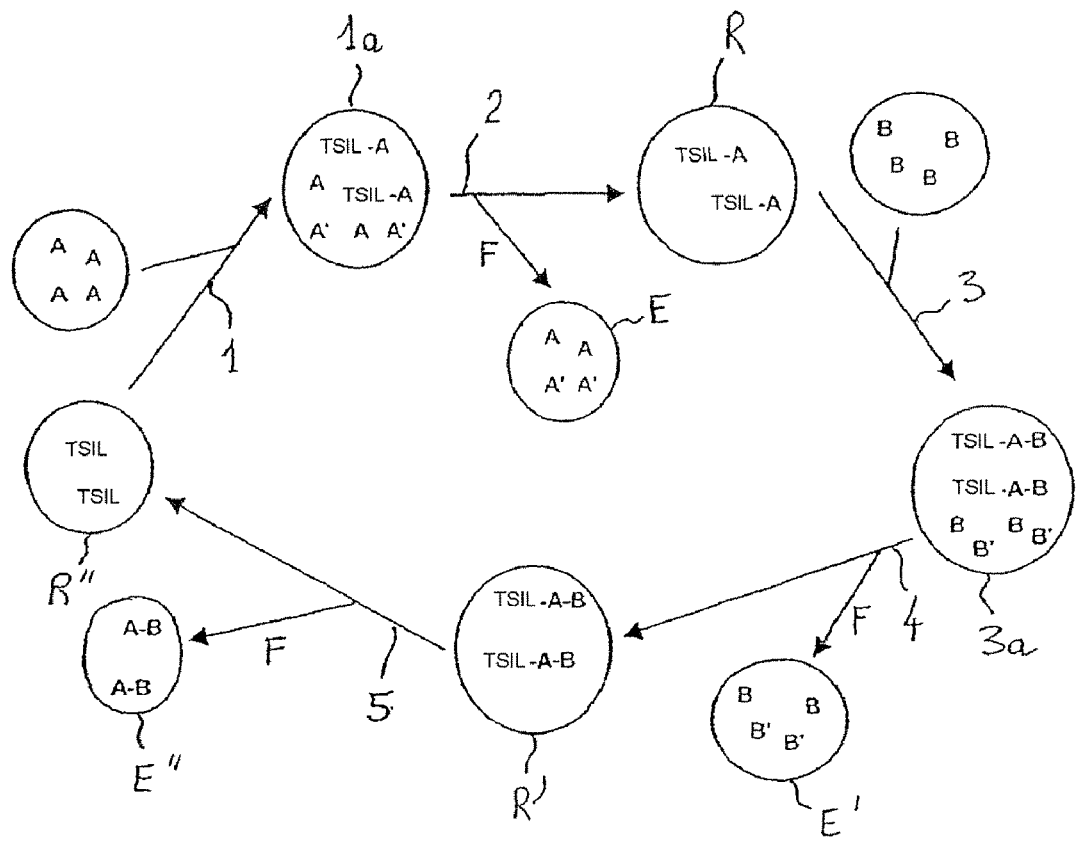

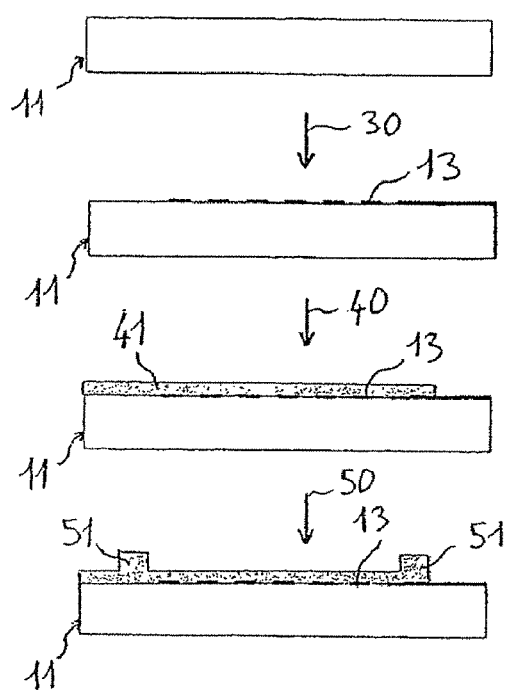
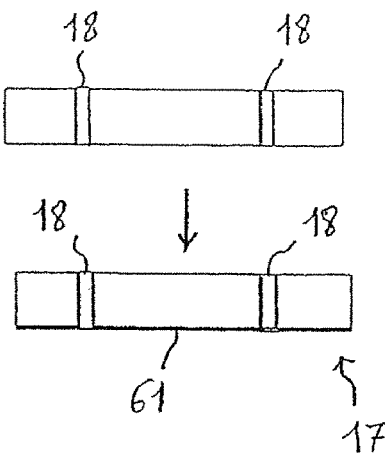
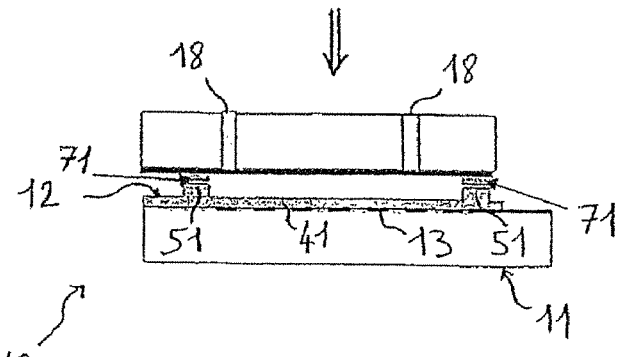
Fig. 6
Fig. 7
Fig. 8

METHOD FOR EXTRACTING AT LEAST ONE COMPOUND FROM A LIQUID PHASE COMPRISING A FUNCTIONALIZED IONIC LIQUID, AND MICROFLUIDIC SYSTEM FOR IMPLEMENTING SAID METHOD

The present invention relates to a process for extracting at least one chemical or biological compound from a liquid phase comprising at least one functionalized ionic liquid, and to a microfluidic system for the implementation of this process.

Room temperature ionic liquids (abbreviated to RTIL) are increasingly used in organic synthesis because of their particularly advantageous properties (cf. "Room Temperature Ionic liquids. Solvents for synthesis and catalysis", T. Welton, *Chemical Reviews*, 1999, 2071-2083). This is because these are relatively nonvolatile solvents with a low vapor pressure which are compatible with the majority of known chemical reagents, which are thermally stable, which are relatively nonflammable and which can be recycled.

In addition to these applications as reaction solvents, room temperature ionic fluids have numerous advantages for liquid-liquid and liquid-gas extraction. Just like supercritical fluids or fluorinated solvents, these ionic liquids are generally immiscible with volatile organic solvents (abbreviated to VOS) and, because of their very high vapor pressures, they can be separated by direct distillation from the solvents (cf. "Modern Separation techniques for the Efficient Workup in Organic Synthesis", C. C. Tzschucke et al., *Angewandte Chemie, Engl. Int. Ed.*, 2002, 3964-4000).

It is known in the literature to use these ionic liquids as extraction fluids during the following separation operations:
- ionic liquid/other solvent or aqueous phase two-phase extraction (cf. "RT ionic liquids as novel media for clean liquid-liquid extraction", J. G. Huddleston et al., *Chem. Commun.*, 1998, 1765-1766);
- liquid/liquid microextraction using a drop of an ionic liquid coupled to liquid chromatography (cf. "Ionic liquid-based liquid-phase microextraction, a new sample enrichment procedure for liquid chromatography", J. Liu et al., *J. Chromatograph. A*, 2004, 1026, 143-147);
- separations of gaseous, liquid, sulfur-comprising contaminants in hydrocarbons (cf. documents of patent WO-A-2003/070667 and WO-A-2003/040264);
- separation of compounds exhibiting very similar boiling points (cf. document of patent WO-A-2002/074718); and
- extraction of heavy metals by complexing agents in ionic liquids (cf. "First application of calixarenes as extractants in room-temperature ionic liquids", S. Kojiro, *Chemistry Letters*, 2004, 320-321).

It should be noted that all these separation operations are targeted at extracting a compound using an extraction fluid composed of an ionic liquid, that is to say and causing this compound to migrate, by material transfer, from the liquid phase to the ionic liquid.

Recently, interest has been taken in functionalized room temperature ionic liquids, also known as task-specific ionic liquids (abbreviated to TSIL in the continuation of the present description), which are particularly well suited to homogeneous-phase supported synthesis. Reference may be made on this subject to the document of patent WO-A-2004/029004.

These functionalized ionic liquids combine the advantages of syntheses in the liquid phase and on a solid support, owing to the fact that they make it possible:
- in the liquid phase, to carry out a large number of reactions, to rapidly optimize the operating conditions and to synthesize products in large amounts, and
- on a solid support, to rapidly purify by successively washing the solid support in various solvents.

French patent application No. 04 07623, filed on 8 Jul. 2004 on behalf of the Applicant Company and of the Centre National de la Recherche Scientifique, presents a microfluidic system comprising a microreactor which is composed of a drop comprising at least one functionalized or nonfunctionalized ionic liquid. This microreactor is without walls, the interface of the ionic liquid(s) with the surrounding medium and with the support on which the drop is deposited defining the limits of the microreactor.

This patent application also relates to processes for implementing chemical or biochemical reactions and/or mixtures using this microreactor of drop type, and it mentions the extraction and/or the purification of the product(s) resulting from the reaction carried out in the drop of ionic liquid.

One aim of the present invention is to provide a process for the extraction of at least one chemical or biological compound from the liquid phase comprising at least one functionalized ionic liquid, via a liquid extraction fluid immiscible with said ionic liquid(s), which makes it possible to carry out in particular unit operations:
(i) of purification of a microdrop comprising a mixture, on the one hand, of molecules of at least one chemical or biological compound supported by at least one functionalized ionic liquid and, on the other hand, of an excess of this or these compound(s) which have not reacted with these supported molecules and/or of byproducts of the reaction of this ionic liquid with this or these compound (s) for the extraction of this excess of unreacted compounds and/or these byproducts; and
(ii) of cleavage of the support in a microdrop comprising molecules of chemical or biological compounds supported by at least one functionalized ionic liquid, for the extraction of these compounds.

To this end, the extraction process according to the invention comprises moving, on a surface of a microfluidic system, at least one microdrop of said liquid phase in an extraction bath which comprises said extraction fluid and which is located on said surface in order to obtain, at the outlet of said bath, under the effect of an electric field, an extract moving away from said surface which is based on said extraction fluid and which is enriched in said or at least one of said compound (s) and a raffinate moving about on said surface which is based on said ionic liquid(s) and which is depleted in said or at least one of said compound(s).

According to another characteristic of the invention, said microdrop is moved in said bath under the effect of said electric field, in such a way that it moves about in contact with said surface.

According to another characteristic of the invention, said extraction fluid is circulated in said bath by forced convection and continuously in order for said raffinate obtained to be composed of said ionic liquid(s) (i.e., in order for the latter to be obtained in the pure state).

In the case (i) above, said extract obtained then comprises a mixture, on the one hand, of said extraction fluid and, on the other hand, of said excess of said compound(s) which are not reacted and/or of said reaction byproduct(s), and said raffinate comprises said supported molecules.

In the case (ii) above, said extract obtained then comprises, by cleavage of said support, a mixture of said extraction fluid and of said compounds separated from said functionalized ionic liquid, and said raffinate comprises the latter.

The term "liquid phase comprising at least one functionalized ionic liquid" which constitutes said microdrop which can be used according to the invention is understood to mean, in the present description, a mixture:
- of at least one chemical or biological compound, and
- of a pure functionalized ionic liquid, of a mixture of pure functionalized ionic liquids or also a mixture of one or more functionalized ionic liquid(s) and of one or more nonfunctionalized ionic liquid(s), optionally with one or more solvent(s).

It should be noted that said or each compound can be bonded to said or to each functionalized ionic liquid or else can be free in the mixture.

The or each functionalized (i.e., task-specific) ionic liquid which can be used in the microdrop according to the invention exists in the liquid form at ambient temperature and it can be represented by the formula $A_1^+ X_1^-$, in which:
a) $A_1^+$ represents a functional or nonfunctional cation or else a mixture of cations in which either none of the cations is functional or at least one of the cations is functional,
b) $X_1^-$ is a functional or nonfunctional anion or a mixture of anions in which either none of the anions is functional or at least one of the anions is functional, provided that
c) the cation $A_1^+$ and/or the anion $X_1^-$ carry at least one functional group capable of reacting with said chemical or biological compound.

It should be noted that a functionalized ionic liquid $A_1^{+X}{}_1^-$ (i.e., comprising at least one functional ion) can act partly as reaction medium and partly as soluble support or matrix, whereas a nonfunctionalized ionic liquid $A_1^+ X_1^-$ acts solely as inert reaction medium or matrix with regard to the reactants and is capable of dissolving them.

The expression "functional cation" denotes a molecular group which has at least one chemical functional group, a portion of this molecular group carrying a positive charge. The expression "functional anion" denotes a molecular group which has at least one chemical functional group, a portion of this molecular group carrying a negative charge. The expression "nonfunctional cation" denotes a molecular group without the chemical functional group, a portion of this molecular group carrying a positive charge. The expression "nonfunctional anion" denotes a molecular group without a chemical functional group, a portion of this molecular group carrying a negative charge.

In the present invention, it is possible to use, as $A_1^+$, a functional cation or a mixture of cations, at least one of which is functional, and/or, as $X_1^-$, a functional anion or a mixture of anions, at least one of which is functional, said functional cations and functional anions corresponding to a respectively cationic or anionic ionic entity bonded to at least one functional group $F_i$, $F_i$ varying from $F_0$ to $F_n$ and n being an integer varying from 1 to 10.

The functional group $F_i$ can be chosen in particular from the following functional groups: hydroxyl, carboxyl, amide, sulfone, primary amine, secondary amine, aldehyde, ketone, ethenyl, ethynyl, dienyl, ether, epoxide, phosphine (primary, secondary or tertiary), azide, imine, ketene, cumulene, heterocumulene, thiol, thioether, sulfoxide, phosphorus-comprising groups, heterocycles, sulfonic acid, silane, stannane or functional aryl and any functional group resulting from a chemical, thermal or photochemical conversion or a conversion by microwave irradiation of the preceding functional groups.

Some functionalized ionic liquids, in particular those with large anions, such as $NTf_2^-$, $PF_6^-$, $BF_4^-$ or $CF_3SO_3^-$, can be liquid at ambient temperature or melt at low temperature, for example

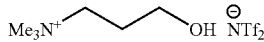

is liquid at ambient temperature (Tf represents $CF_3SO_2$).

Advantageously, said or at least one of said functionalized ionic liquids which can be used according to the invention is chosen from the group consisting of an ammonium salt, an imidazolium salt, a phosphonium salt, an onium salt and a mixture of several of these salts.

Use may be made, for example, of a functionalized onium salt of formula $A_1^+ X_1^-$ as reaction support which comprises a functional cation and/or a functional anion corresponding to an ionic entity Y—, namely respectively a cationic entity $Y^+$— or an anionic entity $Y^-$—, optionally bonded via an arm L, in particular an alkyl group comprising from 1 to 20 carbon atoms, to at least one functional group $F_i$, $F_i$ varying from $F_0$ to $F_n$ and n being an integer varying from 1 to 10, it being possible for the functional cation to be represented in the form $Y^+$-L-$F_i$ and the functional anion in the form $Y^-(L)_k$-$F_i$, k being equal to 0 or 1, and it being possible for the functional anion to represent, when k is equal to 0, a simple anion, corresponding to $Y^-F_i$, chosen in particular from:

$OH^-$, $F^-$, $CN^-$, $RO^-$, $RS^-$, $RSO_3^-$, $RCO_2^-$ or $RBF_3^-$, where R represents an alkyl group comprising from 1 to 20 carbon atoms or an aryl group comprising from 6 to 30 carbon atoms.

The expression "functionalized onium salt" denotes the ammonium, phosphonium and sulfonium salts as well as all the salts resulting from the quaternization of an amine, of a phosphine, of a thioether or of a heterocycle comprising one or more of these heteroatoms, and carrying at least one functional group $F_i$. This expression also denotes an onium salt, the cation of which as defined above is not functionalized but the anion of which carries a functional group $F_i$. This expression can also denote a salt, the anion and the cation of which carry a functional group $F_i$. A preferred functionalized onium salt is chosen in particular from the following:

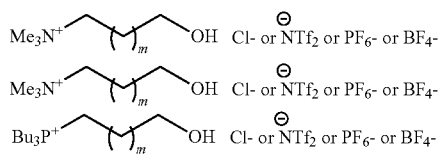

m being an integer from 0 to 20.

Mention may be made, as examples of nonfunctionalized ionic liquids which can be used in the microdrops according to the invention in combination with one or more functionalized ionic liquids, of, for example, onium salts chosen from imidazolium, pyridinium, $Me_3N^+$-Bu or $Bu_3P^+$-Me cations and $NTf_2^-$, $PF_6^-$ or $BF_4^-$ anions, such as 1-butyl-3-methylimidazolium tetra-fluoroborate [bmim][$BF_4$], 1-butyl-3-methylimidazolium hexafluorophosphate [bmin][$PF_6$], 1-butyl-3-methyl-imidazolium bis(trifluoromethylsulfonyl)imide [bmin][$NTf_2$], 1-ethyl-3-methylimidazolium hexafluorophosphate [emim][$PF_6$] and butyltrimethylammonium bis(trifluoromethylsulfonyl)imide [btma][$NTf_2$].

According to another characteristic of the invention, said extraction fluid used in the extraction process according to the invention can be of organic or aqueous solvent type and it advantageously comprises at least one volatile organic solvent (VOS) chosen from the group consisting of diethyl ether, ethyl acetate and chlorinated solvents, such as dichloromethane, chloroform or carbon tetrachloride.

In an alternative form, said extraction fluid can comprise at least one aqueous solvent, such as water subjected to deionization.

According to another advantageous characteristic of the extraction process according to the invention, said electrically conducting microdrop is moved in contact with said surface under the effect of an electric field, preferably by moving, by electrowetting (ElectroWetting on Dielectric (EWOD)), said microdrop both in said bath and upstream and downstream of the latter, via a plurality of electrodes covering said surface.

These electrodes, supported by the substrate of the microfluidic system, are insulated and surface treated in order to obtain low wetting of said microdrops bathing in said extraction fluid. It should be noted that these microdrops are electrically conducting, due to the or each ionic liquid which they comprise, whereas said extraction fluid exhibits a virtually zero electrical conductivity.

Advantageously, the extraction process according to the invention is implemented by moving said microdrop continuously in said bath, which makes it possible to optimize material transfer by force diffusion between said microdrop to be purified and said extraction fluid.

More advantageously still, said microdrop is moved in said bath along a predetermined path and preferably around a central region of the bath, for example circularly, which makes it possible to effectively localize said bath on said surface of the microfluidic system.

According to a first embodiment of the invention, said bath and said extract are respectively obtained by at least one stream for introducing said extraction fluid and by at least one stream for extracting said bath, at least one of these introduction and extraction streams being conveyed in a capillary which extends and emerges above said surface.

According to a first implementational example of this first embodiment according to the invention, said extraction bath is formed by a drop of said extraction fluid which is deposited on said surface and which is in communication with the entire surrounding space situated above said surface, and at least one of said introduction and extraction streams moves along inside a capillary under which said extraction drop is formed.

According to a second implementational example of this first embodiment according to the invention, said extraction bath is formed by a confined volume of said extraction fluid which is delimited by two respectively lower and upper walls formed by said surface and by a sheet mounted on said surface, said volume being in communication substantially with the entire lateral surrounding space between said walls, and at least one of said introduction and extraction streams moving along inside a capillary emerging in an orifice of said sheet and being in communication with said confined volume.

According to a second embodiment of the invention, said bath and said extract are respectively obtained by at least one stream for introducing said extraction fluid and by at least one stream for extracting said bath, at least one of these introduction and extraction streams extending into the body of said microfluidic system on emerging at said surface.

According to a first implementational example of this second embodiment according to the invention, said extraction bath is formed by a drop of said extraction fluid which is deposited on said surface and which is in communication with the entire surrounding space above said surface, and at least one of said introduction and extraction streams moving along inside a channel embedded in said microfluidic system on which said extraction drop is formed.

According to a second implementational example of this second embodiment according to the invention, said extraction bath is formed by a confined volume of said extraction fluid which is delimited by two respectively lower and upper walls formed by said surface and by a sheet mounted on said surface, said volume being in communication substantially with the entire lateral surrounding space between said walls, and at least one of said introduction and extraction streams moving along inside a channel embedded in said microfluidic system and which is flush with said surface.

In accordance with these first and second examples of the abovementioned first and second embodiments according to the invention:
  said introduction and extraction streams advantageously emerge in said bath substantially perpendicular to said surface,
  said extraction stream is advantageously recycled continuously in said introduction stream, this "regeneration" of the extraction fluid making it possible to reduce the amount thereof used, and
  said extraction bath (i.e., said extraction drop or said confined volume) is open to the surrounding space on at least two of its opposite sides, for moving, in contact with said surface, said microdrop upstream and downstream of said bath.

In accordance with the first example relating to the abovementioned first or second embodiments according to the invention, said extraction drop is removed from said surface by suction in order to obtain said extract.

Preferably, the microdrop composed of said liquid phase which is subjected to extraction according to the invention exhibits a volume of between 0.1 µl and 10 µl, and the volume of this microdrop is planned to be much less than that of the extraction bath in order to optimize the diffusion into the latter.

A microfluidic system according to the invention for the implementation of the extraction process as defined above is of the type exhibiting a substrate, one surface of which is covered with electrodes suitable for moving thereon, under the effect of an electric field, microdrops of a liquid phase comprising at least one functionalized ionic liquid.

According to the invention, this microfluidic system is provided with means for introducing a liquid extraction fluid onto said surface and for extracting it therefrom by forced convection, so as to obtain an extraction bath which is located on said surface for the extraction of at least one chemical or biological compound from said liquid phase and which is open to the surrounding space on at least two of its opposite sides, for moving, in contact with said surface, said microdrop upstream and downstream of said bath.

Mention may be made, as substrate which can be used in said analytical device, of any inorganic or organic and biocompatible substrate.

In connection with the abovementioned first embodiment according to the invention, this system is advantageously such that said means for introducing and extracting said extraction fluid respectively comprise two capillaries, at least one of which extends and emerges above said surface and perpendicular to the latter.

In connection with the abovementioned second embodiment according to the invention, this system is advantageously such that said means for introducing and extracting said extraction fluid respectively comprise two channels, at least one of which is embedded in said microfluidic system and is flush with said surface perpendicular to the latter, so as to be in communication with said bath.

In connection with said first example of the first and second embodiments according to the invention, said means for introducing and extracting said extraction fluid are appropriate for said extraction bath to be formed by a drop of said extraction fluid in communication with the entire surrounding space situated above said surface.

In connection with said first example of the second embodiment according to the invention, said channels are appropriate for said drop forming said bath to cover the respective ends of these channels.

In connection with said second example of the first and second embodiments according to the invention, said microfluidic system additionally comprises a sheet which is mounted on said surface via vertical supports and which delimits, with said surface, two respectively upper and lower walls defining a confined volume for said bath, which is in communication substantially with the entire lateral surrounding space between said walls. This sheet can optionally act as a counterelectrode in the electrowetting process.

In connection with said second example of said second embodiment according to the invention, said channels are flush with said surface between vertical supports which connect the periphery of said sheet to said surface, so as to form said confined volume forming said bath.

According to another characteristic of the invention, said microfluidic system is advantageously such that:
the electrodes covering the substrate, such as gold electrodes, are covered with an electrical insulator, such as silica or silicon nitride ($Si_3N_4$), and
said sheet is based on borosilicate glass and on a plastic, and said supports are based on a photosensitive resin, such as an epoxy resin, this sheet being deposited on these supports via an adhesive.

THE BRIEF DESCRIPTION OF THE DRAWINGS

Figure 2:
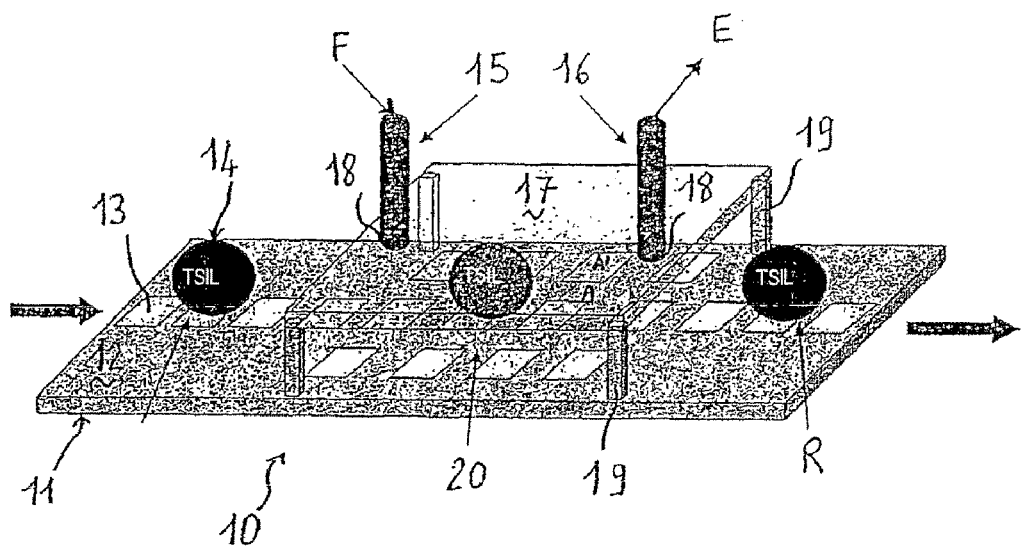
Figure 3:
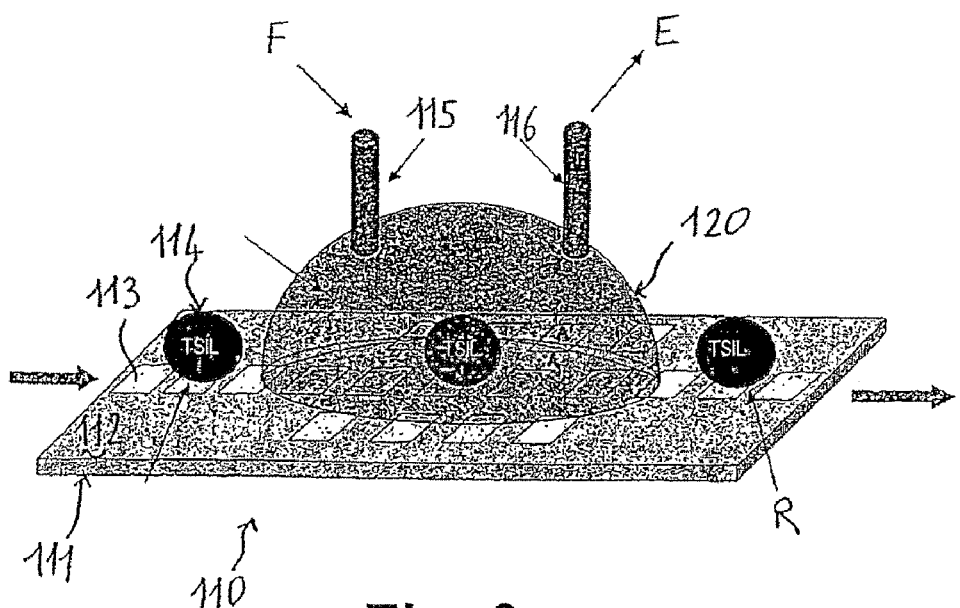
Figure 4:
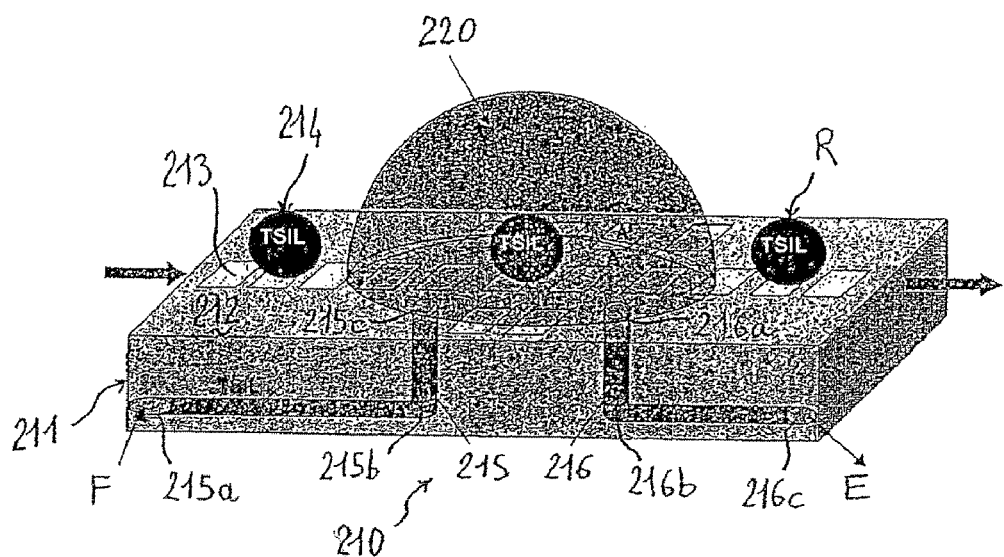
Figure 5:
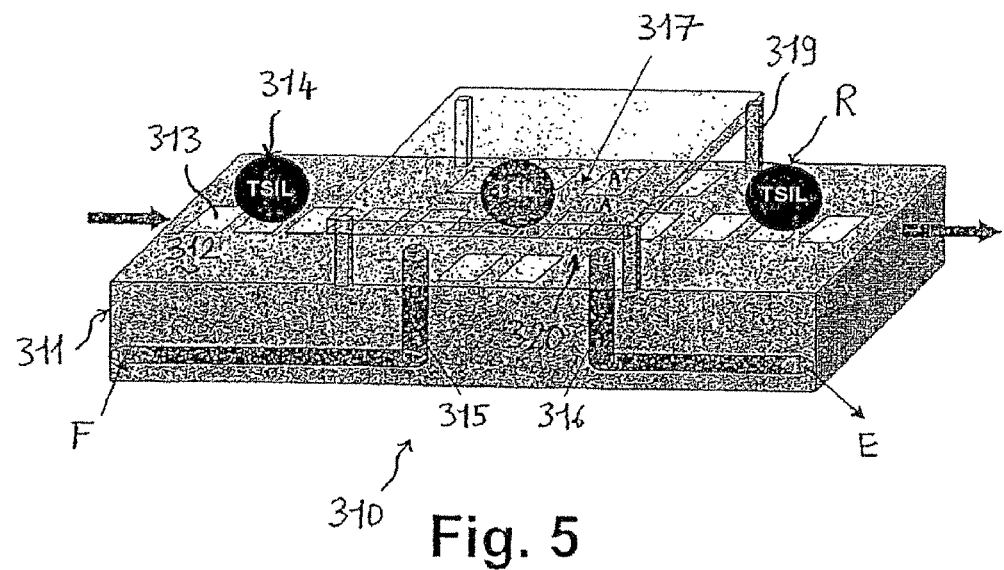

The abovementioned characteristics of the present invention, and others, will be better understood on reading the following description of several implementation examples of the invention, given by way of illustration and without implied limitation, said description being made in connection with the appended drawings, among which:

FIG. 1 is a summarizing process diagram illustrating examples of applications of the extraction process according to the invention, FIG. 2 is a diagrammatic perspective view of a microfluidic system according to a first embodiment of the invention, FIG. 3 is a diagrammatic perspective view of a microfluidic system according to an alternative embodiment of FIG. 2, FIG. 4 is a diagrammatic perspective view of a microfluidic system according to a second embodiment of the invention, FIG. 5 is a diagrammatic perspective view of a microfluidic system according to an alternative embodiment of FIG. 4, FIG. 6 diagrammatically illustrates various stages of a process for the manufacture of a substrate seen in cross section of a microfluidic system according to FIG. 2, FIG. 7 diagrammatically illustrates a process for manufacture of a counterelectrode seen in cross section and intended to be assembled on the substrate of FIG. 6, and FIG. 8 is a diagrammatic cross sectional view of a microfluidic system according to FIG. 2 obtained by assembling the counterelectrode of FIG. 7 on the substrate of FIG. 6.

FIG. 1 illustrates a synthetic process employing the reaction A+B→A−B on a support comprising at least one functionalized ionic liquid "TSIL", it being possible for this reaction to be of chemical type (creation of covalent bond) or of biological type (affinity of reaction, such as hybridization, antibody/antigen interaction or protein/substrate interaction, without implied limitation).

Stage 1 of this process illustrates a first reaction between molecules of this ionic liquid TSIL and molecules of a first reactant A, in order to obtain a mixture 1a comprising supported molecules TSIL-A, excess unreacted molecules of the reactant A and molecules A' corresponding to a byproduct from this first reaction.

Stage 2 of this process illustrates a first unit operation for separation of the unreacted reactant A and of the byproduct A' by a liquid/liquid extraction according to the invention applied to this mixture 1a via an extraction fluid F. An extract E comprising, in addition to the extraction fluid F, molecules of A and of A' and a raffinate R comprising the supported molecules TSIL-A are thus obtained.

Stage 3 of this process illustrates a second reaction between these supported molecules TSIL-A of the raffinate R and molecules of a second reactant B, in order to obtain a mixture 3a comprising supported molecules TSIL-A−B, excess molecules of the reactant B which have not reacted with the supported molecules TSIL-A and molecules B' corresponding to a byproduct of this second reaction.

Stage 4 of this process illustrates a second unit operation for separation of the unreacted reactant B and of the byproduct B' by liquid/liquid extraction according to the invention applied to this mixture 3a via an extraction fluid F. An extract E' comprising, in addition to the extraction fluid F, molecules of B and of B' and a raffinate R' comprising the supported molecules TSIL-A−B are thus obtained.

Stage 5 of this process illustrates a third unit operation for "cleavage of the support" which consists in "cleaving" and in then separating, by liquid/liquid extraction according to the invention applied to this raffinate R' via an extraction fluid F, the molecules of TSIL support (raffinate R" obtained) from the supported reaction product A−B (extract E" obtained).

The microfluidic system 10 according to the invention was illustrated in FIG. 2 and comprises a substrate 11, one surface 12 of which is covered with electrodes 13 which are, for example, based on gold and which are covered with an electrical insulator, such as silica or silicon nitride. These electrodes 13 are appropriate for making it possible to move, over the surface 12, advantageously by electrowetting, microdrops 14 of a liquid phase comprising at least one functionalized ionic liquid (for example, TSIL-A) and free substances in solution (A and A'), cf. FIG. 1.

This system 10 is provided with capillaries 15 and 16 which are respectively intended to introduce a liquid extraction fluid F onto the surface 12 and to extract it therefrom by force convection and which both extend and emerge above the surface 12 and perpendicular to the latter, so as to obtain an extraction bath 20 based on the extraction fluid which is located on the surface 12 for the extraction of at least one chemical or biological compound (A, A', for example, cf. FIG. 1) from the liquid phase.

To this end, the system 10 comprises a sheet 17 in which the capillaries 15 and 16 emerge via two respective orifices 18 of the sheet 17, so that these capillaries 15 and 16 are in communication with the bath 20. The sheet 17 is provided at its periphery with vertical supports 19 mounted on the surface 12 and this sheet 17 delimits, with the surface 12, a confined volume of parallelepipedal shape for this bath 20, after the fashion of an open "cover". As illustrated in FIG. 2, this bath 20 is in communication substantially with the entire lateral surrounding space between the surface 12 and the sheet 17, in order to make it possible to move, in contact with the electrodes 13, each microdrop 14 by electrowetting in the bath 20 and upstream and downstream of the latter.

For example, in connection with the unit operation 2 of FIG. 1, the system 10 is appropriate for obtaining, by force diffusion of the microdrop 14 in the bath 20 and continuous circulation of the extraction fluid F:

via the extraction capillary 16, an extract E comprising the extraction fluid and the compounds A and A', and via electrodes 13, a microdrop of raffinate R comprising the grafted ionic liquid TSIL-A in the pure state for the purpose of another operation, e.g. another chemical or biological reaction or an analysis.

For the following description of the other embodiments of the invention relating to FIGS. 3 to 5, use has to be made of the numerical references increased by 100 to denote components of the corresponding microfluidic system which are identical or analogous to those of FIG. 2.

The microfluidic system 10 according to the invention which is illustrated in FIG. 3 differs from the system 10 of FIG. 2 solely in that it is appropriate for forming an extraction bath 120 composed of a drop deposited on the surface 112 via the introduction capillary 115 and withdrawn from the surface 112 by suction via the capillary 116, so that the extraction fluid F is in circulation via these capillaries 115 and 116. The drop forming this extraction bath 120 is thus planned to be formed under the capillaries 115 and 116 and it is in communication with the entire surrounding space situated above the surface 112.

For example, in connection with the unit operation 2 of FIG. 1, the system 110 is appropriate for obtaining, by force diffusion of the microdrop 114 into the drop forming the bath 120 and continuous circulation of the extraction fluid F:

via the capillary 116, an extract E comprising the extraction fluid F and the compounds A and A', and via the electrodes 113, a microdrop of raffinate R which is moved over the surface 112 and which comprises the grafted ionic liquid TSIL-A in the pure state for the purpose of another operation, e.g. a reaction or an analysis.

The microfluidic system 210 according to the invention, which is illustrated in FIG. 4, differs from the system 110 of FIG. 3 only in that it is provided with two channels 215 and 216 embedded in the substrate 211 and which are flush with the surface 212 of this substrate 211 perpendicular to the latter, in place of the capillaries 115 and 116.

The introduction channel 215 is appropriate for receiving the extraction fluid F via its inlet 215a emerging at a face perpendicular to the surface 212 and, via a right-angled elbow 215b which it comprises, for delivering it in the form of a drop via its outlet 215c which is flush with the surface 212, so as to form the extraction bath 220 by continuously depositing and sucking off this drop. The extraction channel 216 is appropriate for withdrawing from the bath 220, via the extraction fluid F, the extract E comprising, for example, the excess reactant A and the byproduct A' via its inlet 216a which is flush with the surface 212, and, via a right-angled elbow 216b which it comprises, for withdrawing it from the substrate 211 via an outlet 216c emerging on another face of the substrate 211 perpendicular to the face 212.

For example, in connection with the unit operation 2 of FIG. 1, the system 210 is appropriate for obtaining, by force diffusion of the microdrop 214 into the drop forming the bath 220 and continuous circulation of the extraction fluid F:

via the capillary 216, an extract E comprising the extraction fluid F and the compounds A and A', and via the electrodes 213, a microdrop of raffinate R which is moved over the surface 212 and which comprises the grafted ionic liquid TSIL-A in the pure state for the purpose of another operation, e.g. a reaction or an analysis.

In a third embodiment, not represented, it can be advantageous to provide a capillary for introducing fluid via the top and a capillary for extracting via the substrate, without a cover-forming sheet. The advantage of this combination is to combine the advantages of each of the two other embodiments:

simplified technology, due to the absence of cover;

no passage from an open environment to a confined environment, due to the absence of cover;

perfect positioning of the extraction region over the microfluidic system, by centering the introduction capillary over this region;

possibility of completely withdrawing the extraction liquid via the capillary provided in the substrate.

In these embodiments involving movements by electrowetting, it can be advantageous to add a counterelectrode to the system, for example in the form of a conducting wire in contact with the microdrop.

In the same way, the microfluidic system 310 according to the invention which is illustrated in FIG. 5 differs from the system 10 of FIG. 2 only in that it is provided with two channels 315 and 316 embedded in the substrate 311 which are analogous to the channels 215 and 216 of FIG. 4.

After the fashion of the channels 215 and 216 of FIG. 4, the channels 315 and 316 are flush with the surface 312 of the substrate 311 between vertical supports 319 which connect the periphery of the sheet 317 to the surface 312, so as to form a confined volume forming the extraction bath 320.

For example, in connection with the unit operation 2 of FIG. 1, the system 310 is appropriate for obtaining, by force diffusion of the microdrop 314 into the bath 320 and continuous circulation of the extraction fluid F:

via the extraction capillary 316, an extract E comprising the extraction fluid and the compounds A and A', and via the electrodes 313, a microdrop of raffinate R comprising the grafted ionic liquid TSIL-A in the pure state for the purpose of another operation, e.g. a reaction or an analysis.

It should be noted that the microfluidic systems 10 to 310 according to the invention make it possible to separately recover the two liquid phases composed of the extract E and of the raffinate R. Thus, for the "purification" stages 2 and 4 of FIG. 1, the microdrop of TSIL-A or TSIL-A–B is recovered and the extraction fluid F comprising the impurities A' and B' and the excess reactants A and B is removed separately, whereas, for stage 5 of "cleavage of the support", the reaction product A–B is recovered in the extraction fluid F and the TSIL microdrop is recycled separately, for example for other reactions.

The liquid/liquid extraction process according to the invention is advantageously employed in the following way.

The electrically conducting microdrops 14 to 314 based on functionalized ionic liquid(s) are moved by the electrowetting technique referred to as EWOD (ElectroWetting on Dielectric), voltages of 10 to 100 V being applied. To this end, the electrodes 13 to 313 are insulated and surface treated beforehand in order to obtain low wetting of the microdrops 14 and 314 immersed in the extraction bath 20 to 320. In contrast to these microdrops 14 to 314, the extraction fluid F chosen, such as a volatile organic solvent (e.g., diethyl ether, ethyl acetate or a chlorinated solvent), exhibits a very low electrical conductivity, so that it is not moved at the surface 12 to 312 of the microfluidic system 10 to 310.

The extraction according to the invention is carried out at ambient temperature (i.e., typically between 20 and 25° C.) or optionally while slightly cooling the microfluidic system 10 to 310, in order to limit the evaporation of the extraction fluid F.

In order to optimize the material transfer by force diffusion between the microdrop 14 to 314 and the extraction fluid F and the localization of the extraction bath 20 to 320 on the surface 12 to 312, this microdrop is moved continuously in said bath around a central point of the latter.

FIGS. 6 to 8 illustrate, by way of example, the essential stages of a process for the manufacture of the microfluidic system 10 according to the invention incorporating the sheet 17.

As illustrated in FIG. 6, the substrate 11 according to the invention is obtained essentially by carrying out the following stages:
- in a first stage 30, a network of electrodes 13 is deposited by photolithography in or on the substrate 11, which is, for example, based on "Pyrex" glass or on oxidized silicon;
- in a second stage 40, these electrodes 13 are electrically insulated by a deposited layer 41 of silica or of $Si_3N_4$ produced by PECVD (plasma enhanced chemical vapor deposition) and then the deposited layer 41 obtained is subjected to photolithography in order to release the contact; then
- in a third stage 50, "partitions" 51 of photosensitive resin "SU8" are deposited by photolithography on the substrate 11 thus treated, which partitions are provided in order to perform a role analogous to that of the supports 19 in FIG. 2, for the purpose of the subsequent assembling of the counterelectrode 17 on the substrate 11.

As illustrated in FIG. 7, when a counterelectrode is desired on the sheet 17, it is obtained by depositing by photolithography, on a sheet made of "Pyrex" glass or of plastic pierced with openings 18, a coating 61 made of ITO (indium tin oxide) on the lower face of the sheet which is intended to face the electrodes 13 of the substrate 11. Optionally, this layer of ITO can be covered with a layer of controlled hydrophobicity, in order to improve the moving of the drops.

As illustrated in FIG. 8, the counterelectrode 17 thus obtained is assembled on the "partitions" 51 of the substrate 11 by the "adhesive screen printing" technique, a film of adhesive which is homogeneous 71 being deposited at the interface between the coating 61 and these "partitions" 51. This film of adhesive 71 exhibits a thickness of less than a few micrometers and the adhesive used is, for example, sold by Supratec under the name "Delo-Katiobond 45952". Reference may be made, for example, to the document of patent WO-A-00/77509 for a precise description of this "adhesive screen printing" technique.

What is claimed is:

1. A process for extraction of at least one chemical or biological compound from a liquid phase including at least one functionalized ionic liquid, via a liquid extraction fluid that is immiscible with the ionic liquid, the process comprising:
    moving, on a surface of a microfluidic system, at least one microdrop of the liquid phase in an extraction bath that includes the extraction fluid and that is located on the surface to obtain, at an outlet of the bath, under effect of an electric field, an extract moving away from the surface that is based on the extraction fluid and that is enriched in the at least one compound and a raffinate moving about on the surface that is based on the ionic liquid and that is depleted in the at least one compound.

2. The process as claimed in claim 1, wherein the microdrop is moved in the bath under the effect of the electric field such that the microdrop moves about therein in contact with the surface.

3. The process as claimed in claim 1, wherein the extraction fluid is circulated in the bath by forced convection and continuously in order for the raffinate obtained to be composed of the ionic liquid.

4. The process as claimed in claim 2, wherein the microdrop is moved in contact with the surface by electrowetting in the bath and upstream and downstream of the latter via a plurality of electrodes covering the surface, the microdrop being electrically conducting, unlike the extraction fluid, the electrical conductivity of which is virtually zero.

5. The process as claimed in claim 4, wherein the microdrop is moved along a predetermined path around a central region of the bath.

6. The process as claimed in claim 1, wherein the bath and the extract are respectively obtained by at least one stream for introducing the extraction fluid and by at least one stream for extracting the bath, at least one of the introducing and extracting streams extending and emerging above the surface.

7. The process as claimed in claim 1, wherein the bath and the extract are respectively obtained by at least one stream for introducing the extraction fluid and by at least one stream for extracting the bath, at least one of the introducing and extracting streams extending into the microfluidic system on emerging at the surface.

8. The process as claimed in claim 6, wherein the introducing and extracting streams emerge in the bath substantially perpendicular to the surface.

9. The process as claimed in claim 6, wherein the extracting stream is recycled in the introducing stream.

10. The process as claimed in claim 1, wherein the extraction bath is open to a surrounding space on at least two of its opposite sides, for moving, in contact with the surface, the microdrop upstream and downstream of the bath.

11. The process as claimed in claim 10, wherein the bath is deposited on the surface and an operation for removal therefrom is carried out by suction to obtain the extract, such that the bath is in communication substantially with an entire surrounding space situated above the surface.

12. The process as claimed in claim 10, wherein the extraction bath is formed by a drop of the extraction fluid that is in communication with an entire surrounding space situated above the surface.

13. The process as claimed in claim 6, wherein at least one of the introducing and extracting streams moves along inside a capillary under which the drop of the extraction fluid is formed.

14. The process as claimed in claim 7, wherein at least one of the introducing and extracting streams moves along inside a channel embedded in the microfluidic system on which the drop of the extraction fluid is formed.

15. The process as claimed in claim 10, wherein the extraction bath is formed by a confined volume of the extraction fluid that is delimited by two respectively lower and upper walls formed by the surface and by a sheet mounted on the surface, the volume being in communication substantially with an entire lateral surrounding space between the walls.

16. The process as claimed in claim 6, wherein at least one of the introducing and extracting streams moves along inside a capillary emerging in an orifice of a sheet.

17. The process as claimed in claim 7, wherein at least one of the introducing and extracting streams moves along inside a channel embedded in the microfluidic system and that is flush with the surface.

18. The process as claimed in claim 1, wherein the microdrop of the liquid phase exhibits a volume of between 0.1 µl and 10 µl.

19. The process as claimed in claim 1, wherein the microdrop subjected to the extraction comprises a mixture:
- of molecules of the chemical or biological compound supported by the functionalized ionic liquid, and
- of an excess of the chemical or biological compound that have not reacted with the molecules and/or of a byproduct of reaction of the functionalized ionic liquid with the chemical or biological compound, and
- the extract includes a mixture of the extraction fluid and of excess of the unreacted compound and/or of the reaction byproduct, the raffinate including the molecules.

20. The process as claimed in claim 1, wherein the microdrop subjected to the extraction comprises molecules of the chemical or biological compound supported by the functionalized ionic liquid, and the extract comprises, by cleavage of the support, a mixture of the extraction fluid and of the compounds separated from the functionalized ionic liquid, the raffinate comprising the latter.

21. The process as claimed in claim 1, wherein the at least one of the functionalized ionic liquids is chosen from the group consisting of an ammonium salt, an imidazolium salt, a phosphonium salt, an onium salt, and a mixture of plural of these salts.

22. The process as claimed in claim 1, wherein the extraction fluid includes at least one volatile organic solvent chosen from the group consisting of diethyl ether, ethyl acetate and chlorinated solvents, dichloromethane, chloroform and carbon tetrachloride.

23. The process as claimed in claim 1, wherein the extraction fluid includes at least one aqueous solvent or water subjected to deionization.

* * * * *